United States Patent [19]

Kobus et al.

[11] Patent Number: 4,595,926

[45] Date of Patent: Jun. 17, 1986

[54] DUAL SPACE FED PARALLEL PLATE LENS ANTENNA BEAMFORMING SYSTEM

[75] Inventors: Joseph P. Kobus; Kenneth A. Ringer, both of Phoenix, Ariz.

[73] Assignee: The United States of America as represented by the Secretary of the Army, Washington, D.C.

[21] Appl. No.: 557,014

[22] Filed: Dec. 1, 1983

[51] Int. Cl.[4] ........................ H01Q 3/26; G01S 19/06

[52] U.S. Cl. .................................... 343/368; 343/427; 343/754; 343/777

[58] Field of Search ............... 343/427, 371, 374, 376, 343/754, 756, 368, 777, 778, 911 R

[56] References Cited

U.S. PATENT DOCUMENTS 3,631,503 12/1971 Tang et al. .......................... 343/371

3,761,936 9/1973 Archer et al. ........................ 343/374

4,080,605 3/1978 Hilton ................................ 343/754

4,353,074 10/1982 Monser et al. ...................... 343/786

*Primary Examiner*—Theodore M. Blum

*Assistant Examiner*—Gregory C. Issing

*Attorney, Agent, or Firm*—Anthony T. Lane; Jeremiah G. Murray; Edward Goldberg

[57] ABSTRACT

A beamforming system for a linear phased array antenna system which can be used in a monopulse transceiver, comprising a pair of series connected parallel plate constrained unfocused lenses which provide a suitable amplitude taper for the linear array to yield a low sidelobe radiation pattern. Digital phase shifters are used for beam steering purposes and the unfocused lenses decorrelate the quantization errors caused by the use of such phase shifters.

5 Claims, 9 Drawing Figures

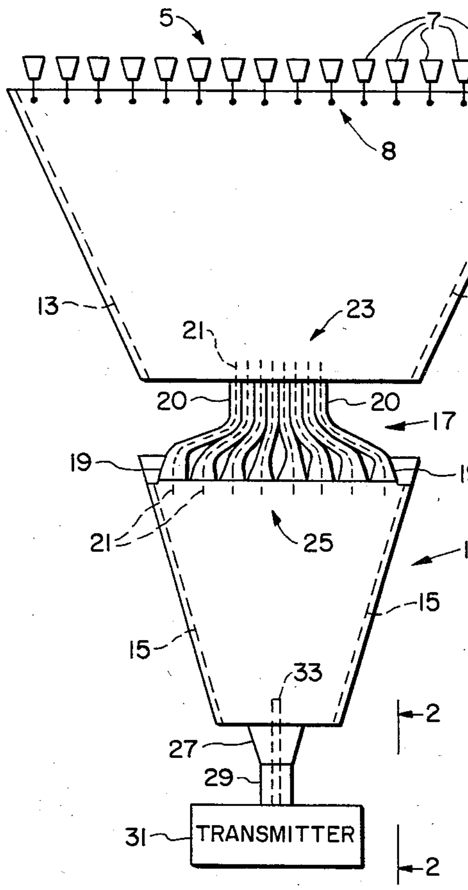
FIG. 1
FIG. 2
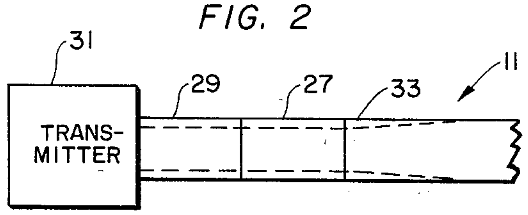
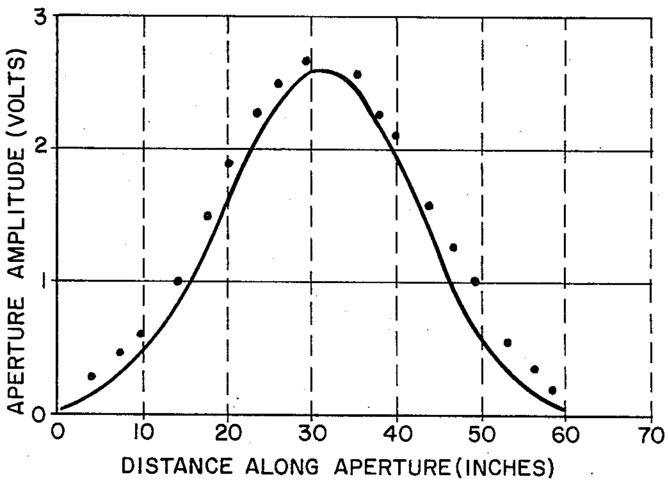
FIG. 3
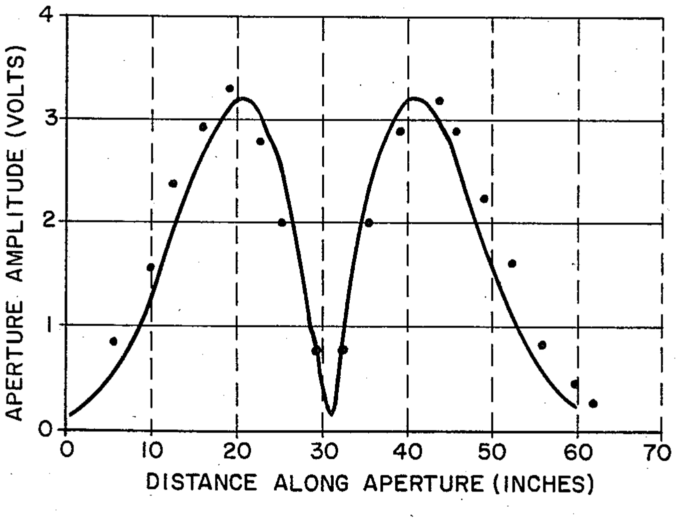
FIG. 4

DUAL SPACE FED PARALLEL PLATE LENS ANTENNA BEAMFORMING SYSTEM

The Government has rights in this invention pursuant to contract DAAK20-81-C-0878, awarded by the Department of the Army.

BACKGROUND OF THE INVENTION

This invention relates to a beamforming system for a linear phased array antenna which can be used in a monopulse radar or communications system. Monopulse radars are tracking radars which can derive target angle tracking error on the basis of a single pulse by measuring the relative phases or amplitudes of target echoes received in two closely spaced beams wherein both beams result from a single transmitter pulse. This technique eliminates tracking errors caused by pulse-to-pulse amplitude fluctuations caused for example by target motion, in systems which require several pulses to obtain target error information. Monopulse radars often utilize phased array antennas which can be electronically steered for scanning purposes and can be easily adapted to measure the phase or amplitude differences required to derive the angular tracking error.

Phase array antennas require that the power applied to the elements thereof be tapered off toward the ends thereof if excessive sidelobes in the antenna pattern are to be avoided. Further, the use of digital phase shifters for beam steering or other purposes introduces quantization errors which degrades the antenna performance. The present invention provides a broadband low loss power distribution network for achieving a desired amplitude and phase distribution to the elements of a phased array antenna in a way which provides low sidelobes over an octave band and also minimizes the adverse effects of the use of the digital phase shifters by decorrelating the aforementioned phase shifter quantization.

There are two fundamentally different ways to form the patterns of a phase array. One is by means of a conventional corporate feed with a variable phase shifter between each output network and the radiating elements of the array. The other is through the use of a dual space-fed lens system like that of the present invention substituted for the corporate feed. The concept of the invention is clearly superior in most respects, including relative cost effectiveness, relative efficiency, relative weight efficiency and low sidelobe levels over an octave band.

Isolated unequal power divisions are required when using a corporate feed to generate a suitable amplitude taper for realization of low sidelobes. Corporate feeds require power dividers which are isolating four port junctions, and wideband isolated unequal power dividers using waveguide components are almost impossible to implement. Thus the ability of conventional corporate feeds to maintain low sidelobes for very wide bandwidth arrays is limited. Furthermore, this conventional apparatus is neither cost effective nor weight efficient.

SUMMARY OF THE INVENTION

The concept of the invention, which is inherently broadband, uses two series connected, unfocused parallel plate space-fed lenses. Both lenses comprise a spaced pair of parallel conductive plates in the shape of isosceles trapezoids, with the first lens smaller than the second. The function of the first lens is to provide a suitable tapered amplitude distribution for feeding the second larger lens, which ultimately furnishes the highly tapered amplitude distribution for feeding the individual radiators of the phased array.

A single, H-plane, double ridged waveguide sectoral horn provides a space feed for the input of the small lens.

The output of the small lens is connected to the input of the large lens by means of a plurality of H-plane, double ridged guides including sectoral horns with a phase shifter in each guide. These inter-lens phase shifters compensate for the unfocused small lens and also compensate for phase changes vs. frequency or temperature in the plurality of feed channels between the two lenses. A second set of phase shifters is located in the feed lines between each output port of the large lens and each radiator of the array. The purpose of the output phase shifters is to provide digitally controlled beam steering as well as compensation for the unequal delays between the inputs and outputs of the unfocused large lens. All of the phase shifters are non-reciprocal and therefore serve to isolate residual impedance mismatches from the two lenses.

It can be shown that the dual space fed lens beamforming system of the present invention can provide a convenient way to synthesize low sidelobe phased array difference patterns. No simple, cost effective way is known to do this with the aforementioned corporate feed network.

The use of unfocused lenses permits the arrangement of lens inputs and outputs in straight lines which simplifies the microwave apparatus and reduces the mutual coupling which would result between array radiators mounted on the curved surfaces of a focused lens.

The array radiators are conical monopoles with end caps suitably coupled to the output ports of the large lens. The spacing between the trapezoidal plates of the lenses is made less than half a wavelength of the highest frequency of operation, so that both lenses are constrained lenses with the energy propagating therein in the transverse electromagnetic (TEM) mode. The ridged waveguides used at the inputs of both of the constrained, unfocused lenses are tapered into the parallel plates thereof to form a gradual transition to the TEM mode therein.

A circulator is also included in each of the ridged waveguides which feed the large lens to allow received signals to be diverted to the receive channel manifolds.

The input ports of the large lens comprising the aforementioned plurality of ridged guides comprise a linear array disposed along the shorter parallel side of the trapezoid forming the large lens. The radiation pattern of this array is designed to space feed the large lens output ports in such a way that the desired amplitude distribution to the array radiators is achieved.

The non-parallel sidewalls of both lenses are covered with absorbing material to prevent reflections therefrom.

It is thus an object of this invention to provide a novel beamforming system for a monopulse antenna comprising a linear array of radiators, comprising a pair of space fed parallel plate, unfocused constrained lenses designed to provide a suitable amplitude distribution to the said array of radiators so that wideband, low sidelobe antenna performance results.

A further object of the invention is to provide a beam-forming system for a linear phased array antenna wherein dual unfocused parallel plate lenses are used to provide a suitably tapered amplitude distribution for said phased array.

A still further object of the invention is to provide a beam-forming system for a phased array antenna for use in a monopulse system wherein digital phase shifters are utilized for beam steering purposes and the beamforming system comprises unfocused constrained lenses which decorrelate the quantization errors caused by the use of said digital phase shifters.

A further object of the invention is to provide an antenna comprising a linear array of radiators connected to the output ports of a large unfocused parallel plate constrained lens which is space fed from an array of double ridged waveguides connected to the input ports of said large constrained lens, and wherein a small unfocused parallel plate constrained lens is fed by a single sectoral horn with double ridges therein, and wherein the output ports of said small lens are applied to the input ports of said large lens by means of double ridged waveguides.

These and other objects and advantages of the invention will become apparent from the following detailed description and the drawings.

BRIEF DESCRIPTION OF THE DRAWINGS

FIG. 1 is a schematic of the invention which illustrates the principles of operation thereof.

FIG. 2 shows a side view of a portion of FIG. 1.

FIGS. 3 and 4 show, respectively, ideal sum and difference aperture distributions for a dual lens beam-forming system.

DETAILED DESCRIPTION OF A PREFERRED EMBODIMENT

Figure 5:
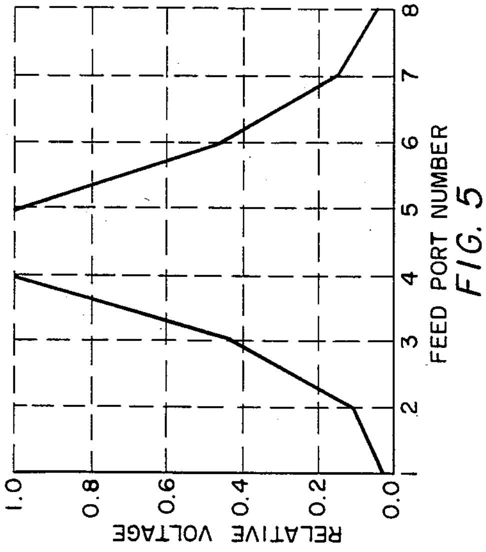
FIGS. 5 through 8 are graphs of the relative voltage distributions at the input of the large lens of FIG. 1 at four different frequencies.
Figure 6:
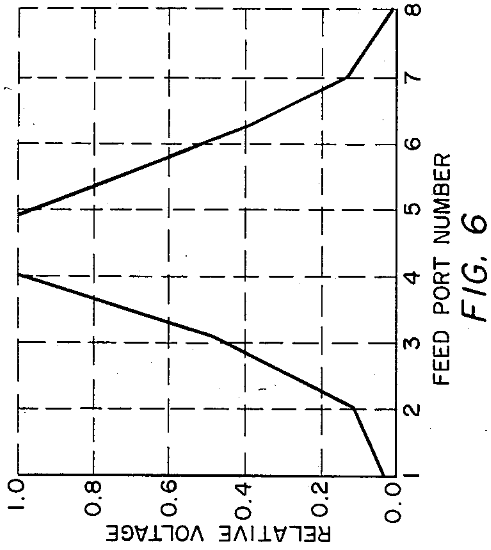
Figure 7:
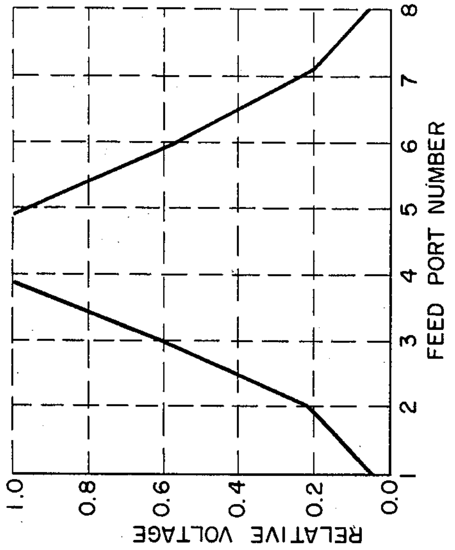
Figure 8:
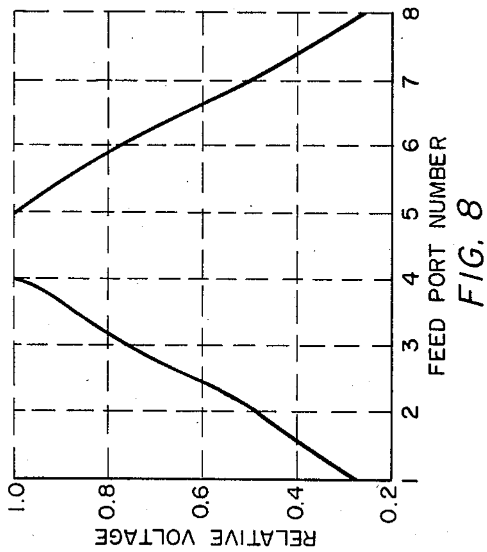

The schematic of FIG. 1 is a top view of the system of the present invention showing the two unfocused parallel plate lenses 9 and 11 both of which comprise a spaced pair of metal parallel plates which are in the shape of isosceles trapezoids.

The input to the smaller unfocused lens 11 is along the shorter parallel side thereof. This small lens comprises a one-to-eight port space fed power distributing array having its single input port at the center of the shorter side of the trapezoid and its eight output ports arranged along the longer parallel trapezoid side. The input port comprises a single H-plane sectoral horn 27 connected to transmitter 31 by waveguide 29. The H-plane waveguide 29 and horn 27 both are provided with double ridges 33 along the center of the width thereof with the ridges gradually tapering off inside the parallel plate lens 11, as shown in FIG. 2. This gradual taper of the ridges provides a smooth transition to the transverse electromagnetic (TEM) mode which is the only mode of propagation possible within the lenses. To constrain the field within the lenses to the TEM mode, the spacing of the parallel plates of both lenses is made less than half a wavelength at the highest operating frequency. The angled sidewalls of both lenses are provided with microwave absorbing material, as shown at 13 and 15 for lenses 9 and 11, respectively. This material prevents reflections from the sidewalls.

Figure 9:
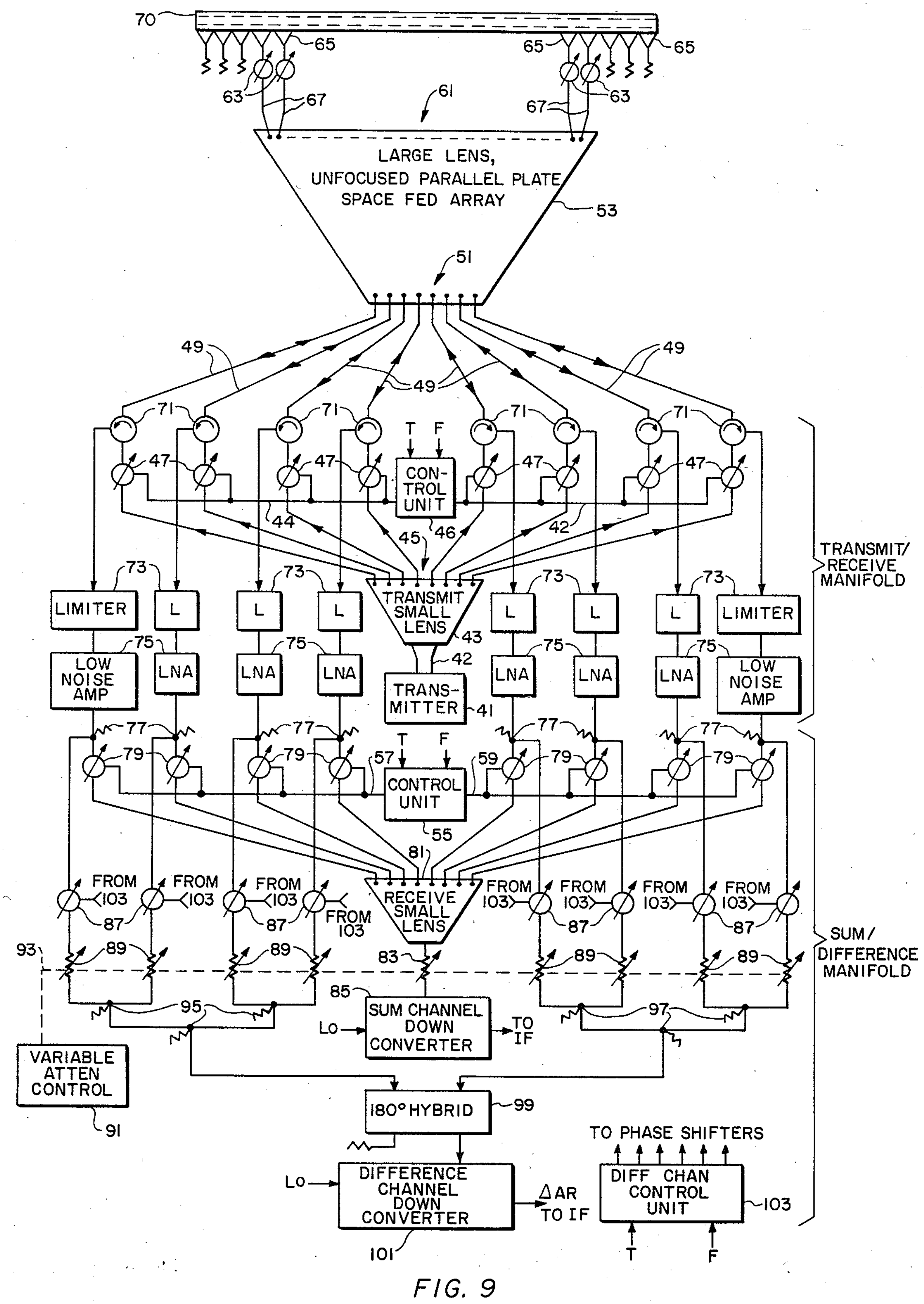
FIG. 9 shows how the invention can be applied to a monopulse transceiver comprising a linear phased array.

The first or small lens 11 provides a suitably tapered amplitude distribution at its eight output ports for feeding the second or large lens 9. The output ports 25 of lens 11 comprise eight double ridged, H-plane sectoral horns 19 arrayed along the longer parallel side thereof as shown in FIG. 1. The horns 19 are connected to waveguides 20 which terminate at the input to the large lens 9 at 23. The double ridges within this interlens waveguide system are indicated by the dashed lines 21 and these ridges are tapered to the top and bottom walls of both lenses in the same manner as are ridges 33 at the input of the small lens. Although not shown in FIG. 1, each of the waveguides of the interlens coupling system 17 may include a phase shifter and a circulator. The phase shifters can be adjusted to compensate for the unfocused small lens as well as to compensate for phase changes vs. frequency or temperature in eight feed channels. The circulators allow received signals to be diverted to the receive channel manifold as shown in the system of FIG. 9.

The eight input ports 23 of the large lens comprise a linear array for space feeding the large lens. The large lens comprises a plurality of output ports 8, arrayed along the longer of its parallel sides. The array of conical monopoles 5 is the large lens output inside the lens and each of the monopoles 7 is suitably coupled to a different one of the output ports 8. Phase shifters (not shown in FIG. 1) are located between the large lens output ports 8 and each of the array radiators 65 (FIG. 9). These phase shifters compensate for the unfocused large lens and also provide for beam steering. All of the phase shifters are non-reciprocal and therefor also serve to isolate residual impedance mismatches between the small and large lenses, particularly those encountered with electronic scanning of a phased array. In application to a fast-frequency-hopped communication system, the phase shifters must be reset between transmit and receive.

It can be shown by computer modeling that a system with a one-to-eight port lens as illustrated in FIG. 1 will exhibit optimum sum and difference distributions for low sidelobe phased arrays. Computer programs have been written for calculating the amplitude and phase at the output ports of an unfocused parallel plate lens such as those utilized in the invention. The analytical model must take into account the fact that for a practical lens configuration, true far-field conditions never apply. Thus, in order to obtain the amplitude and phase distribution at the $i^{th}$ output port, it is necessary to determine the field resulting from the summation of the lens input excitations by taking into account the distance between each input port and the $i^{th}$ port. Because the space fed arrays of the input and output probes are constrained between the parallel plates of the lens, there is no $r^{-1}$ dependence of the fields. The feed illumination spillover absorbed by microwave absorbers 13 and 15 covering the lens sidewalls is taken into account in the computations of the insertion loss.

The analytical model of the small lens 11 of FIG. 1 is represented by a large number of arrays of closely spaced elemental radiators. Each of the horns in the input and output of this lens is represented by an array of these radiators and the amplitude distribution across each of the arrays is assumed to vary as the cosine of each radiator's position in its aperture. The phase of each radiator is given by the path length from the horn vertex to the radiator element. Calculation of the H-plane patterns of the horns by this simple method turned out to yield excellent agreement with more elegant and complex methods. The effective field at each output horn is then obtained by first summing at each elemental point in the output aperture the electric fields resulting from each elemental radiator in the input aperture, paying due regard to the distances involved. A second summation is then performed to obtain the resultant field in the wave guide of each output horn, taking into account the output horn amplitude and phase weighting. In this manner a set of sum channel weightings, BΣ(J), are derived for the input to the large lens. Weightings, BΔ(J) for difference channel patterns are implemented using the circuitry of FIG. 9.

A question arises as to what aperture distributions constitute an optimum set of sum and difference amplitude weightings. Sum and difference pattern sidelobe levels are fixed by operational requirements. Angle tracking sensitivity is affected by the ratio of the difference pattern to sum pattern voltages near the difference pattern boresight null. An optimum design is, therefore, one which exhibits maximum sum pattern aperture efficiency and maximum boresight slope sensitivity for given peak sidelobe levels in the sum and difference patterns. The optimum properties of the Taylor sum pattern distribution are well known. Bayliss has derived an optimum difference pattern. A first order synthesis for a dual lens system such as that of FIG. 1 with a one-to-eight port small lens as shown therein and a 142 element linear output array produces the result as shown in FIG. 3 and 4, wherein the solid line curve in FIG. 3 is the sum pattern and in FIG. 4 is the difference pattern. Also shown in FIG. 3 by means of the dots is the ideal Taylor sum pattern distribution of optimum design, and in FIG. 4 the dots indicate the optimum Bayliss difference pattern distribution. These two sets of curves clearly show that an eight port input array for the large lens is very close to optimum.

FIGS. 5–8 are graphs of the relative voltage distribution at the input to the large lens of FIG. 1 at four different frequencies covering an octave band between 6 and 12 GHz. FIG. 5 represents 12 GHz and FIG. 8, 6 GHz, with the other figures representing intermediate frequencies. It can be seen from these graphs that the amplitude distribution at the small lens output becomes more highly tapered as the frequency increases toward the high end of the octave band. This obviously has the effect of compensating for the increasing electrical width of the eight port input array at the large lens. Consequently, the output amplitude distribution of the large lens remains almost frequency invariant over the operating octave band.

FIG. 9 illustrates an application of the dual lens beam-forming concept to a specific system requirement for simultaneous low sidelobe sum and difference phased array patterns. In this circuit diagram, RF or microwave power delivered from transmitter 41 to the beamforming networks first passes through the small, unfocused, parallel plate space-fed, transmit lens 43, which is similar to the small lens 11 of FIG. 1, with a double-ridged H-plane sectoral horn input, 42, and eight double-ridged, H-plane sectoral horn outputs 45. Eight phase shifters 47 are located in the eight ridged waveguides which connect the output of the small transmit lens 43 to the eight input ports 51 of the large lens 53. The phase shifters 47 compensate for the unfocused transmit lens 43 and compensate for phase changes vs. frequency or temperature in the eight transmit feed channels 49. This latter function is accomplished by a control unit 46 which has inputs T and F for receiving temperature and frequency signals which are converted to control signals on leads 42 and 44 which automatically adjust the phase shifts imparted by phase shifters 47 to the transmitted signals. Extremely precise phase control must be maintained at the eight input ports 51 of the large lens which form a line source feed for the large lens 53. Proper phase adjustment is necessary to achieve the proper amplitude distribution at the large lens output if the desired low sidelobes are to be achieved. The eight phase shifters 47 and the phase shifters 63 between the large lens output and the array antennas 65 are digital, non-reciprocal ferrite latching devices which are commercially available in standard double ridged waveguide. They will handle the RF power required, have low insertion loss and very rapid switching capability. The purpose of the output phase shifters 63 is to compensate for the unequal path delays between the inputs and outputs of the unfocused large lens 53, as well as to provide digitally controlled phase distribution for beam steering purposes. The non-reciprocal phase shifters also serve to isolate residual impedance mismatches between the transmit lens 43 and the large lens 53, particularly those mismatches encountered with electronic scanning of the phased line source horn array. Without adequate isolation from impedance mismatches at the various output ports, it is difficult to develop the amplitude distributions required for low sidelobes. In order to achieve high power handling capability at the eight input ports 51 of the large lens, it is necessary to couple into the parallel plate region with double ridged guides. The ridges are suitably tapered into the parallel plates forming a gradual transition to the TEM mode region within the large lens. This tapering of the ridges is the same as that shown for the ridge 33 of FIG. 2. Within all of the lenses of FIG. 9, modes polarized parallel to the trapezoidal plates are cut off as a result of the plate spacing which is made slightly less than one half a wavelength at the highest operating frequency.

The output ports 61 of the large lens are simply broadbanded conical monopoles with appropriate end caps, suitably spaced relative to each other and relative to the transverse wall between the trapezoidal plates of the large lens. The interface between the probe-coupled large lens output ports 61 and the double ridged waveguide 67 with the phase shifters 63 therein, can be accommodated with fin-line waveguide-to-microstrip transitions (not shown), located inside the double ridged guides 67. Passing on through the output phase shifters 63, ridge waveguide can be used to distribute the power from the beamforming network to the antenna array elements 65. The energy then passes through impedance matching and polarizer assembly 70. A cylindrical reflector and radome (not shown), may also be part of the system.

Eight low loss ferrite circulators, 71, are mounted in the double ridged guides 49 which are part of the transmit/receive manifold. These circulators allow dual use of the large lens and its line source for both transmission and reception of signals. The receive ports of all of the circulators 71 are connected to limiters 73. Since the circulators present only 15 db of isolation between the transmit and receive function, the limiters 73 are necessary to protect the receiver low noise amplifiers 75, which also comprise part of the transmit/receive manifold.

The received signals pass from each of the eight ports 51 of the large lens through the circulators 71, the limiters 73 and low noise amplifiers 75 and then into the sum/difference manifold. At the input to this manifold the received signals are separated into sum and difference channels by commercially available isolated power dividers, 77. At the sum channel outputs of the power dividers 77, the signals enter eight sum channel phase shifters 79. The phase shifter outputs are applied to the eight input ports of the receive small lens 81 where they are combined to form a single signal. The small lens 81 of the receiver is identical to the small transmit lens 43. The purpose of the eight phase shifters 79 is to provide appropriate phase weights to the eight received signals combined in the receiver lens, taking into account the defocusing in the receive lens and phase vs. temperature and frequency changes in the eight sum channel paths between the large lens and the receive lens. The temperature and frequency phase corrections are applied to the phase shifters 79 from control unit 55 over leads 57 and 59.

The phase shifters 63 between the antenna array and the large lens provide the appropriate phase weights to the received signals before they are combined in the large lens. These phase shifters take into account the lens defocusing, the phase errors in the paths between the antenna array 65 and the large lens, and the phase taper required to steer the beam. Note that since the phase shifters are non-reciprocal, they must be reset between transmission and reception of signals, as well as between carrier frequency changes.

The single output of receive lens 81 passes through a diode digital variable attenuator 83 and thence to sum channel down converter 85 where the sum signal is mixed with a local oscillator signal, LO, to yield the sum channel IF signal. The purpose of the sum channel attenuator 83 is to equalize the sum and difference channel insertion losses to maintain the optimum relationship of the sum and difference channel signals required to yield an accurate angle tracking error signal.

The eight difference channel outputs of the power dividers 77 are applied to the eight difference channel phase shifters 87, after which they are appropriately amplitude weighted by diode digital variable attenuators 89. All of the variable attenuators are controlled by variable attenuator control unit 91 via a control linkage or leads indicated by the dashed line 93. The outputs of the four left attenuators 89 are combined in a stripline network consisting of three split-tee power dividers 95, and the outputs of the four right attenuators 89 are similarly combined by similar split-tee power dividers 97. The outputs of the right and left power dividers are combined in a 180 degree hybrid 99, the output of which is applied to the difference channel down converter 101, where the difference signal is converted to an intermediate frequency, $\Delta AR$, by mixing the output of hybrid 99 with the local oscillator signal LO. The difference channel control unit 103 controls the phase shifters in response to temperature and frequency signals T and F applied thereto.

The two intermediate frequencies from the two down converters 85 and 101 are applied to a subsequent circuit, not shown, for deriving the angle tracking error therefrom.

While the invention has been described in connection with illustrative embodiments, obvious variations therein will occur to those skilled in the art, accordingly the invention should be limited only by the scope of the appended claims.

We claim:

1. A beamforming system for a linear phased array of antenna radiators, comprising: first and second series connected parallel plate constrained unfocused lenses, each of said lenses including a pair of parallel plates in the form of isosceles trapezoids having inputs along the shorter parallel ends and outputs along the longer parallel ends and a spacing between said parallel plates of less than one half a wavelength at the highest operating frequency, the first of said lenses being smaller than the second of said lenses, said first lens having a single input and a plurality of output ports, said second lens having a like plurality of input ports said single input port being arranged to space feed said first lens output ports, said input ports of said second lens forming a linear array for space feeding the output ports of said second lens and the radiators of said array, an interlens coupling system including a first plurality of waveguides connecting said output ports of said first lens to said input ports of said second lens including a phase shifter and a circulator in each of said waveguides, and wherein said lenses apply a desired amplitude distribution to said linear phased array whereby a low sidelobe antenna pattern will result.

2. The system of claim 1 wherein the sloping non-parallel sides of said lenses are lined with microwave absorbing material, and including a second plurality of waveguides connecting the outputs of the second of said lenses to said radiators.

3. The system of claim 2 wherein said first plurality of waveguides are double ridged H-plane waveguides, and a second plurality of double ridged H-plane waveguides connect the output ports of said second lens to the radiators of said linear phased array antenna, each of said second waveguides including a digital phase shifter therein for steering the beam of said antenna.

4. The system of claim 3 wherein the ridges of said first double ridged waveguides gradually taper into the parallel plates of said first and second lenses to form a gradual transition between said waveguides and said lenses.

5. A monopulse transceiver comprising, a transmitter connected to the single input of a small, unfocused, parallel plate constrained transmit lens, said transmit lens having eight outputs, means to connect said eight outputs to the eight inputs. of a larger, unfocused, parallel plate constrained lens via a waveguide system including sectoral horns and H-plane double ridged waveguides with phase shifters and circulators in each of said waveguides, a linear phased array of radiators connected to the output ports of said larger lens via waveguides which comprise beam steering phase shifters, said circulators designed to direct received signals to a receiver comprising a sum and difference manifold, said receiver comprising eight limiters and eight low noise amplifiers for receiving signals from said eight circulators, power dividers connected to the outputs of said low noise amplifiers, said power dividers splitting the received signals between a sum channel and a difference channel, said sum channel comprising eight phase shifters connected to one output of each of said power dividers, the outputs of said last-named phase shifters being applied to the eight input ports of a receive small lens which is identical to said small transmit lens, the single output of said small receive lens being connected through a variable attenuator to a sum channel down converter wherein said sum channel signals are converted to an intermediate frequency, and wherein said difference channel comprises eight phase shifters connected to the other of the outputs of said power dividers with variable attenuators connected to each of said last-named shifters, the outputs of said eight attenuators being combined by means of six split-tee power dividers and a 180 degree hybrid to form a difference signal which is applied to a difference channel down converter to form the difference signal intermediate frequency.

* * * * *